United States Patent
Kelley et al.

(10) Patent No.: US 9,362,544 B2
(45) Date of Patent: Jun. 7, 2016

(54) SYSTEMS AND METHODS FOR CONTROL OF A CURRENT INTERRUPTION COMPONENT IN A BATTERY SYSTEM

(71) Applicant: GM GLOBAL TECHNOLOGY OPERATIONS LLC, Detroit, MI (US)

(72) Inventors: Paul W. Kelley, Lake Orion, MI (US); Andrew K. Chandler, Plymouth, MI (US); Brian J. Martel, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 463 days.

(21) Appl. No.: 13/777,492

(22) Filed: Feb. 26, 2013

(65) Prior Publication Data
US 2014/0242421 A1    Aug. 28, 2014

(51) Int. Cl.
*H01M 10/63*    (2014.01)
*H01M 2/34*    (2006.01)
*B60L 11/18*    (2006.01)
*H01M 10/48*    (2006.01)
*H01M 10/42*    (2006.01)

(52) U.S. Cl.
CPC ............. *H01M 2/34* (2013.01); *B60L 11/1851* (2013.01); *H01M 10/48* (2013.01); *H01M 2010/4271* (2013.01); *H01M 2220/20* (2013.01)

(58) Field of Classification Search
CPC ...................................................... H01M 10/42
See application file for complete search history.

(56) References Cited

U.S. PATENT DOCUMENTS

| | | | | |
|---|---|---|---|---|
| 6,064,182 | A | * | 5/2000 | Eguchi .......................... 320/132 |
| 2011/0228436 | A1 | * | 9/2011 | Lee et al. ..................... 361/93.7 |

* cited by examiner

*Primary Examiner* — Jacob Marks
(74) *Attorney, Agent, or Firm* — Phillips Ryther & Winchester; Jared L. Cherry

(57) ABSTRACT

Disclosed herein are systems and methods for control of a current interruption component in a battery system. Various embodiments consistent with the present disclosure may include a detection system configured to detect an event (e.g., an impact event, a resistive short, a coolant leak, etc.) and a control system configured to receive information from the detection system and to generate a control signal based upon detection of the event. The control signal may selectively actuate an electrical clearing component. A current interruption component may be configured to selectively interrupt a flow of current upon an occurrence of a condition that results from actuation of the electrical clearing component. Upon detection of the event by the detection system, the control system may generate the control signal to actuate the electrical clearing component, and the actuation of the electrical clearing component may trigger the current interruption system.

14 Claims, 5 Drawing Sheets

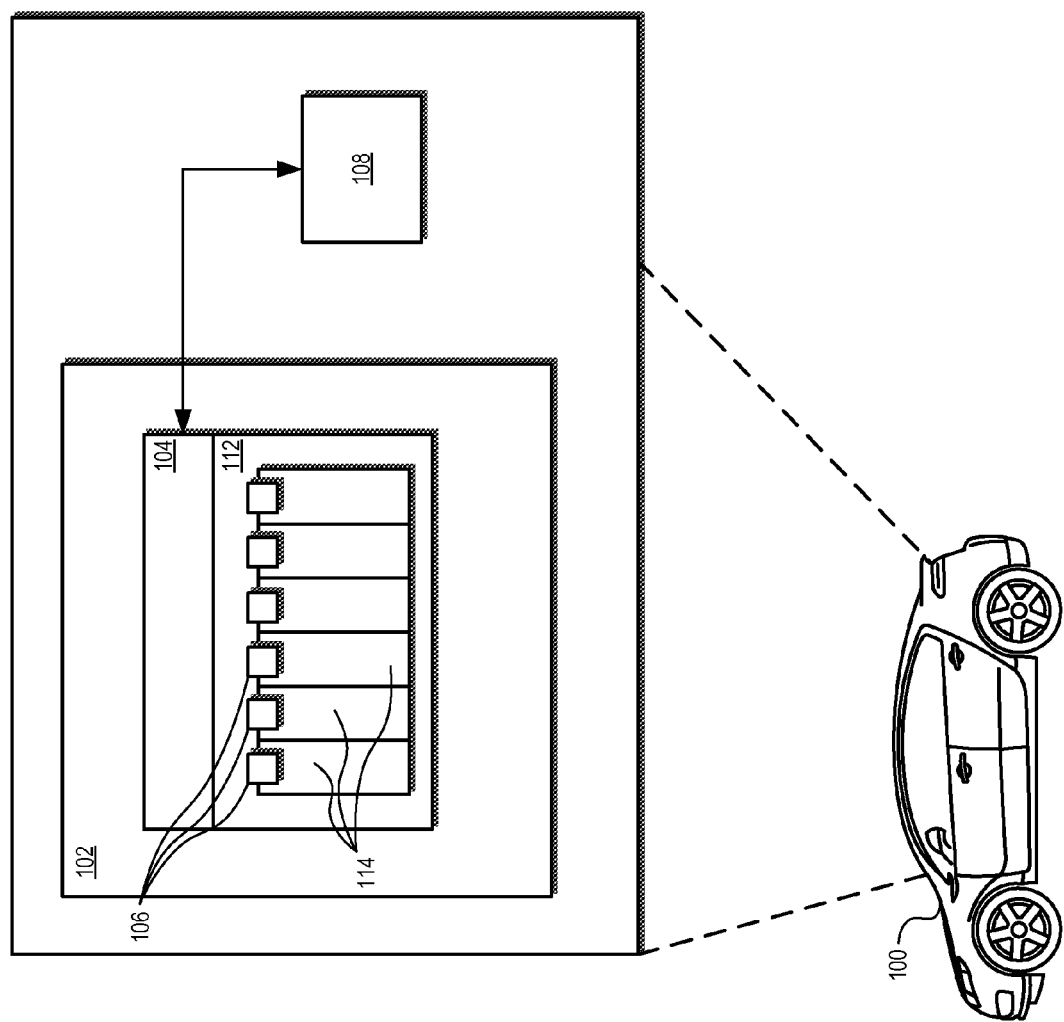

SYSTEMS AND METHODS FOR CONTROL OF A CURRENT INTERRUPTION COMPONENT IN A BATTERY SYSTEM

TECHNICAL FIELD

The systems and methods disclosed herein relate to control of a current interruption component in a battery system. More specifically, the systems and methods disclosed herein relate to control actions that may be implemented upon the occurrence of an event, such as a short, a crash, or other event.

BACKGROUND

Passenger vehicles often include electric batteries for operating a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system may be used to power electric drivetrain components of the vehicle (e.g., electric drive motors and the like).

In instances involving a fault in the battery system, a fault mitigation system may be configured to interrupt the flow of electrical current through the fault. Some fault mitigation systems, however, may fail to actuate unless the fault exceeds a threshold. Further, such system may not respond to conditions that could be ameliorated by actuation of a fault mitigation system.

BRIEF DESCRIPTION OF THE DRAWINGS

Non-limiting and non-exhaustive embodiments of the disclosure are described, including various embodiments of the disclosure with reference to the figures, in which:

FIG. 1 illustrates an exemplary battery system and control system in a vehicle consistent with embodiments disclosed herein.

SUMMARY

Figure 2A:
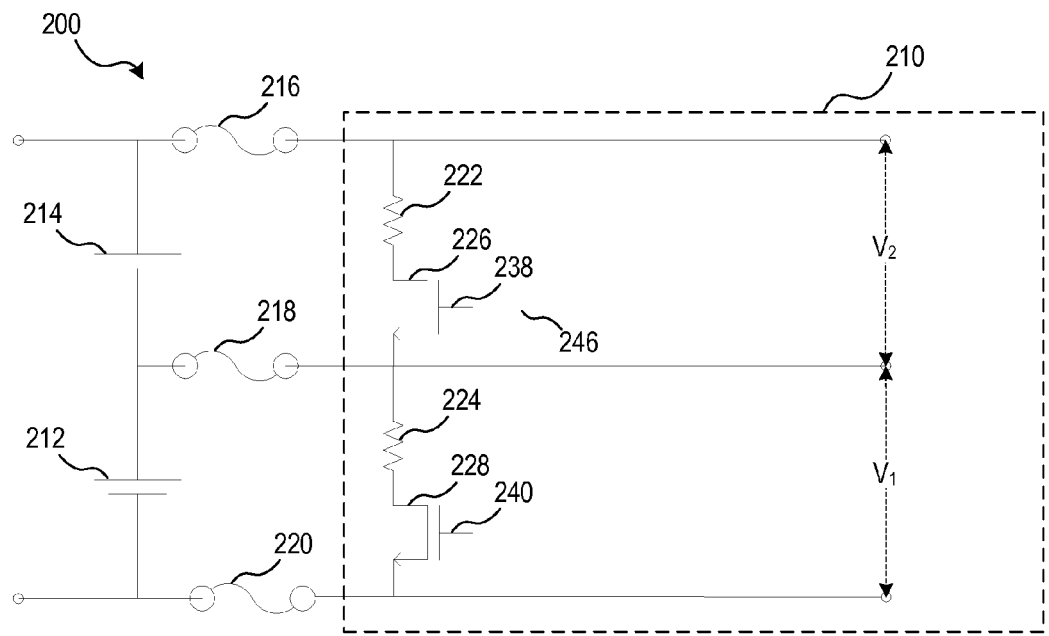
FIG. 2A is a diagram of a circuit including two battery subdivisions and the plurality of subdivision sensing fuses and balance circuits.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description to provide a thorough understanding of the embodiments disclosed herein, some embodiments can be practiced without some or all of these details. Moreover, for the purpose of clarity, certain technical material that is known in the related art has not been described in detail to avoid unnecessarily obscuring the disclosure.

Battery packs for hybrid and purely electric vehicles may include a plurality of subdivisions. For example, a vehicle battery system may include a battery pack that comprises one or more sub-packs or battery cells. The term subdivision, as used herein, may refer to either a sub-pack or a battery cell, or to a plurality of sub-packs or battery cells that together constitute a battery pack.

A battery having a plurality of subdivisions may provide efficiencies in packaging, manufacturability, and serviceability. In battery packs comprising multiple subdivisions, such subdivisions may experience differences in operating conditions, such as temperature, that may impact the performance and/or longevity of the subdivision. In estimating the performance and/or longevity of a battery pack, it may be advantageous to take into account the long term impact of such variations in temperature and the corresponding impact on individual subdivisions.

Consistent with embodiments disclosed herein, a vehicle may include a detection system configured to detect an event. The event may include, among other things, a resistive short, a crash event, a coolant leak, and/or any other occurrence in which it would be desirable to interrupt a follow of electrical current in one or more electrical circuits. The detection system may include a variety of sensor components configured to detect the event. For example, the detection system may include one or more electrical sensor components configured to measure electrical parameters, such as voltage, current, impedance, and the like. Further, the detection system may include a sensor configured to detect a vehicle impact event (e.g., a vehicle collision). According to some embodiments, the detection system may include an accelerometer, an impact sensor, and/or the like.

A vehicle may further include a fault clearing component configured to be selectively actuated based upon the detection of an event. According to one embodiment, the fault clearing component may include a relatively low impedance load connected to an actuation device. The actuation device may comprise, for example, a transistor, a switch, or the like. The actuation device may be configured to impede the flow of electrical current in a typical state, and to facilitate the flow of current when actuated by a signal from the control system. According to some embodiments, the fault clearing component may be disposed in parallel with a second switch component and a second load. The second switch may be configured to facilitate the flow of current in a typical state.

The fault clearing component may operate in conjunction with a current interruption component. Actuation of the fault clearing component may be configured to cause a current interruption component to selectively interrupt a flow of current. The fault clearing component may be configured to respond to a condition that results from actuation of the fault clearing component. According to some embodiments, the condition may include a flow of current exceeding a specified threshold. The current interruption component may respond to the increased flow of current by interrupting the flow of current. The current interruption component may comprise a current limiting device, such as a fuse or a circuit breaker.

Upon detection of an event (e.g., a resistive short, an impact event, or a coolant leak, etc.), the control system may generate a control signal to actuate the fault clearing component. The fault clearing component may be configured to trigger the current interruption system. According to various embodiments, the current interruption system may interrupt an electrical circuit that provides electrical power to one of a pack wiring harness and pack sense lead electronics. Further, the control signal may be generated independent of an occurrence of a pack level fault and independent of a state of charge of the battery.

In some embodiments, a battery system may further comprise main contactors configured to enable discharge of the battery independent of the current interruption component. Accordingly, regardless of the state of the current interruption component, a battery may be discharged via the main contactors. Such embodiments may further incorporate a system (e.g., an internal or external device) configured to couple with the main contactors to form a closed circuit and dissipate the electrical energy stored in the battery. Discharging the battery via the main contactors may be performed following an impact event, diagnostic testing, maintenance, or in other circumstances.

According to some embodiments, one or more of the control system and detection system may be implemented, at least in part, as software. Software-implemented embodiments may utilize instructions executable on a processor. In certain embodiments, the instructions may be stored on a non-volatile and/or non-transitory computer-readable storage medium in communication with the processor. Software-implemented embodiments may be configured to receive information from a detection system and to implement control actions based upon such information.

Various embodiments of the present disclosure may further comprise a method of controlling a current interruption component in a vehicle. According to some embodiments, the method may comprise detection of an event using a detection system. The detection of the event may be communicated to a control system, which may generate a control signal based upon the detection of the event. The control signal may cause actuation of a fault clearing component. The actuation of the fault clearing component may result in a condition that causes a current interruption component to interrupt the flow of current. The condition resulting in the triggering of the current interruption component may result from actuation of the electrical clearing component.

Various systems and methods disclosed herein may realize certain improvements over passive fusing or manual cell discharge actions to remove cell energy from the sensing circuits and electronics. For example, a system incorporating an electrical clearing component may mitigate against delayed thermal events in vehicle battery packs following a vehicle impact event. Further, they system may eliminate or reduce the need for manual intervention on severely damaged vehicles to discharge certain electrical components. The system may also provide immediate mitigation of resistive short failures, and accordingly, may be tied to other actions or events that exist external or internal to the vehicle.

DETAILED DESCRIPTION

FIG. 1 illustrates an exemplary battery system and control system in a vehicle 100 consistent with embodiments disclosed herein. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, an FC drivetrain, and/or any other type of drivetrain suitable for incorporating the systems and methods disclosed herein. The vehicle 100 may include a battery system 102 that, in certain embodiments, may be an HV battery system. The HV battery system may be used to power electric drivetrain components (e.g., as in an electric, hybrid, or FC power system). In further embodiments, the battery system 102 may be a low voltage battery (e.g., a lead-acid 12V automotive battery) and may be configured to supply electric energy to a variety of vehicle 100 systems including, for example, vehicle starter systems (e.g., a starter motor), lighting systems, ignition systems, and/or the like.

The battery system 102 may include a battery control system 104. The battery control system 104 may be configured to monitor and control certain operations of the battery system 102. For example, the battery control system 104 may be configured to monitor and control charging and discharging operations of the battery system 102, detection of a fault in the battery system 102, a coolant leak in the battery system 102, or other conditions relating to the operation of battery system 102. In certain embodiments, the battery control system 104 may be communicatively coupled with one or more sensors 106 (e.g., voltage sensors, current sensors, temperature sensors, and/or the like, etc.) and/or other systems configured to enable the battery control system 104 to monitor and control operations of the battery system 102. For example, sensors 106 may provide battery control system 104 with information relating to electrical parameters associated with one or more of subdivisions 114.

The battery control system 104 may further be configured to provide information to and/or receive information from other systems included in the vehicle 100. For example, according to certain embodiments, battery control system 104 may receive input from a crash detection system or sensor (s), which may be configured to detect a crash or other type of event. Further, battery control system 104 may be communicatively coupled with an internal vehicle computer system 108. In certain embodiments, the battery control system 104 may be configured, at least in part, to provide information regarding the battery system 102 to a user of the vehicle 100 and/or vehicle computer system 108

The battery system 102 may include one or more battery packs 112 suitably sized to provide electrical power to the vehicle 100. Each battery pack 112 may include one or more subdivisions 114. The subdivisions 114 may comprise sub-packs, each of which may comprise one or more battery cells utilizing any suitable battery technology. Suitable battery technologies may include, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies.

Each subdivision 114 may be associated with a sensors 106 configured to measure one or more electrical parameters (e.g., voltage, current, impedance, state of charge, etc.), thermal parameters (e.g., temperature), cooling sensors, crash detection sensors, and the like. A plurality of sensors, together with systems for analyzing data collected by sensors 106 may be included as part of a detection system configured to detect an event that would trigger a current interruption component.

According to the illustrated embodiment, a sensor 106 is associated with each battery subdivision 114. Although FIG. 1 illustrates separate sensors 106 associated with each battery section 114, in some embodiments a sensor configured to measure various electrical parameters associated with a plurality of subdivisions 114 may also be utilized. The electrical parameters measured by sensor 106 may be provided to battery control system 104. Using the electrical parameters, battery control system 104 and/or any other suitable system may coordinate the operation of battery system 102.

In certain embodiments consistent with the present disclosure, battery system 102 may include a plurality of electrical clearing components associated with one or more battery subdivisions 114. Upon the detection of an event, control system 104 may generate a control signal to actuate the one or more electrical clearing components. Actuation of the one or more electrical clearing components may give rise to a condition that causes a current interruption component to selectively interrupt the flow of current.

FIG. 2A illustrates a diagram of a circuit 200 including two battery subdivisions and a plurality of subdivision sensing fuses 216, 218, and 220. Subdivision sensing fuses 216, 218, and 220 are disposed between battery subdivisions 212 and 214 and battery monitoring electronics 210. A voltage measurement circuit (not shown) may measure the voltages $V_1$ and $V_2$. A resistor 222 may be connected in series with a transistor 226. Transistor 226 may function as a subdivision balancing switch, and resistor 222 may function as a subdivision balancing resistor associated with battery subdivision 214. Similarly, a resistor 224 may be connected in series with a transistor 228. Transistor 228 may function as a subdivision balancing switch, and resistor 224 may function as a subdivision balancing resistor associated with battery subdivision 212.

Battery monitoring electronics 210 may be configured to measure subdivision voltages of each subdivision in the battery pack at a periodic rate. According to one embodiment, the periodic rate may be approximately 200 ms. When the measurement is made, transistors 226 and 228 may be configured to impede the flow of current by applying an appropriate control signal applying an appropriate control signal to transistor gates 238 and 240, respectively. In order to impede the flow of current, transistors 226 and 228 may operate in a cutoff region at the time of the measurement. With transistors 226 and 228 operating in the cutoff region, voltages $V_2$ and $V_1$ correspond approximately to the open circuit voltages of battery subdivisions 214 and 212, respectively.

Figure 2B:
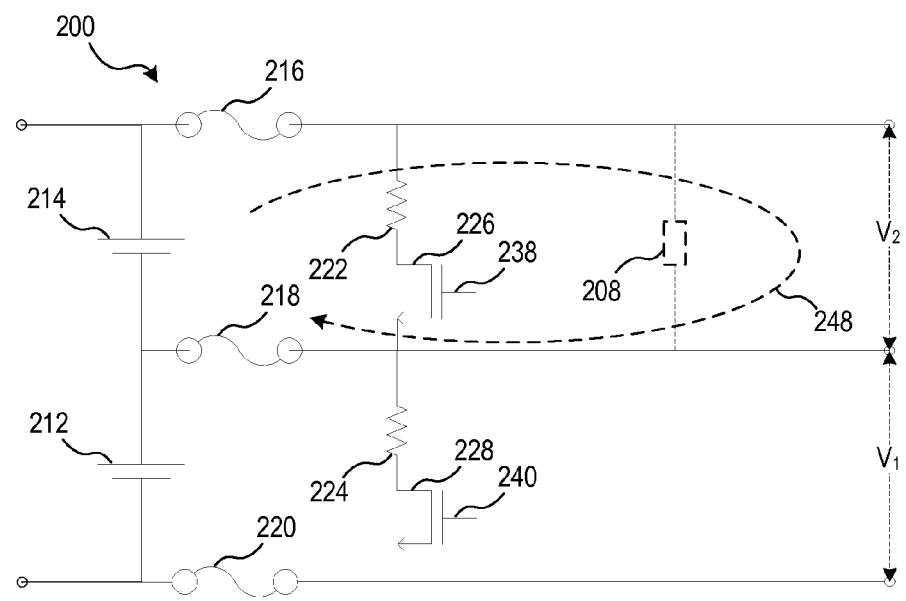
FIG. 2B is a diagram of the circuit illustrated in FIG. 2A, showing a resistive short circuit that results in insufficient current flow to trigger the subdivision sensing fuses.

FIG. 2B illustrates circuit 200 of FIG. 2A, and includes a resistive short 208. Resistive short 208 may result in a current flow that is insufficient to trigger fuses 216 or 218; however, the resistive short may generate heat and may further cause damage to battery monitoring electronics 210 or to the battery pack in general. For example, in one embodiment, fuses 216, 218, and 220 may be 2 amp rated fuses; the resistive short 208 may have an effective resistance of 2.14Ω, and battery subdivision 214 may have a voltage 3.705 V. Accordingly, a current of 1.75 amps may flow through resistive short 208 and generate 6.4 watts of heat. The additional heat created by resistive short 208 and/or the loss of power associated with resistive short 208 may cause damage to a battery pack including battery subdivision 214.

According to some embodiments, a battery system used in an electric vehicle may include 100 or more cell voltage sense leads that could be interrupted upon the detection of an event. The sequence in which current interruption components are selectively actuated may impact the effectiveness of mitigating consequences associated with the detected event. For example, certain sense leads may be also used to power the battery subdivision monitoring electronics. According to some embodiments, a battery system may include subdivision monitoring electronics that are grouped together in groups of 6, 8, 10, or 12. In such embodiments, subdivision monitoring electronics may be powered through a sense lead every 6, 8, 10, or 12 cells, respectively.

Power to the subdivision monitoring electronics may be maintained while the battery subdivision monitoring electronics actuate current interruption components associated with other voltage sense leads. After actuating current interruption components in the other voltage sense leads, the battery subdivision monitoring electronics may be configured to actuate a current interruption component that will interrupt the flow of current providing power to the battery subdivision monitoring electronics. In other words, upon the detection of an event (e.g., a resistive short, a coolant leak, a crash event, etc.), a control system may be configured to trigger current interruption components providing power to subdivision monitoring electronics after triggering all other current interruption components.

Figure 2C:
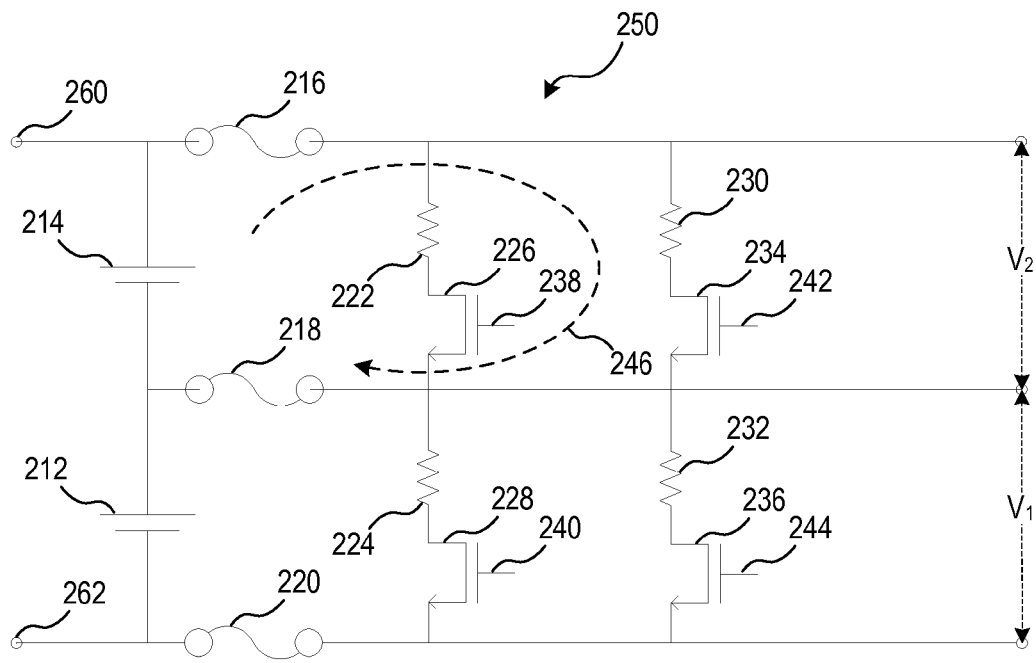
FIG. 2C is a diagram of a circuit including an electrical clearing component and a current interruption component in a typical operating configuration and showing the current flow through the circuit in normal operation.

FIG. 2C illustrates a diagram of a circuit 250 in a typical operating configuration that includes including an electrical clearing component and a current interruption component. According to the illustrated embodiment, the electrical clearing component is embodied as a low-resistance resistor 230 and a transistor 234 disposed in series. The current interruption component is embodied in the illustrated embodiment as a plurality of fuses 216, 218, and 220 that are configured to interrupt the flow of electrical current if the current flow exceeds a threshold.

Under typical conditions, circuit 250 may be configured such that a battery subdivision 214 sources a current, which is designated by arrow 246, that flows through a fuse 216, a resistor 222, transistor 226, and returns through fuse 218. In order to facilitate the flow of current through resistor 222, transistor 226 may operate in an active region. As described above, when voltage $V_2$ is being measured, an appropriate control signal applied to gate 238 may be applied in order to cause transistor 226 to operate in the cutoff region. In the active region, the equivalent resistance of transistor 226 may be relatively low, while in the cutoff region the equivalent resistance of transistor 226 may be relatively high.

While transistor 226 is operating in the active region, transistor 234 may be operating in the cutoff region. Accordingly, transistor 234 may impede the flow of current through resistor 230. A control signal 242 may be applied to transistor 234 in order to maintain transistor 234 in the cutoff region.

A plurality of circuits associated with respective battery subdivisions may operate in similar fashion to what has been described in the preceding paragraphs. Specifically, FIG. 2C illustrates two circuits that may operate in similar fashion. Again, under typical conditions, a battery subdivision 212 sources a current that flows through a fuse 218, a resistor 224, a transistor 228 and returns through fuse 220. A control signal 240 applied to transistor 228 may cause transistor 228 to operate in the active region. A control signal 244 applied to transistor 236 may cause transistor 236 to operate in the cutoff region, and accordingly transistor 236 may impede the flow of current through resistor 232. Resistor 232 may have a relatively low electrical resistance in comparison to resistor 224. Resistor 232 may operate in conjunction with transistor 236 as an electrical clearing component. A voltage, $V_1$, may be approximately equal to the voltage of battery subdivision 212.

Circuit 200 may include contactors 260 and 262 configured to enable discharge of the battery independent of the current interruption component. As illustrated in the circuit diagram illustrated in FIG. 2C, contactors 260 and 262 may remain in electrical communication with battery subdivisions 212 and 214 regardless of the status of fuses 216 and 218. Contactors 260 and 262 may be utilized to discharge battery subdivisions 212 and 214 in a variety of circumstances, such as following an impact event, during servicing, or other appropriate times.

Figure 2D:
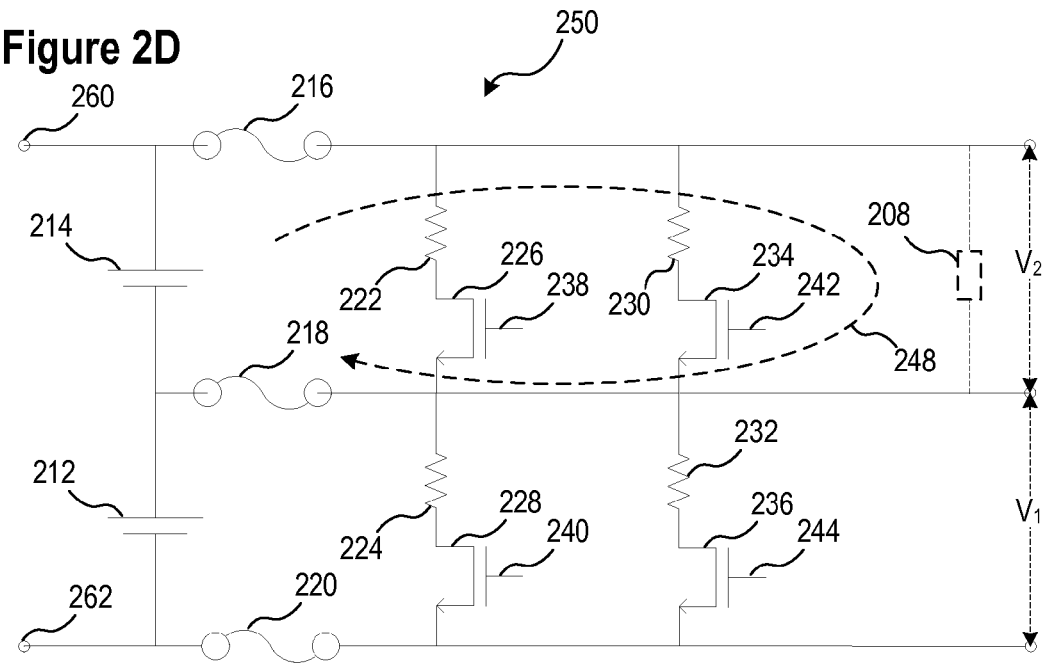
FIG. 2D is a circuit diagram of the circuit illustrated in FIG. 2C in a configuration following the detection of an event and the actuation of an electrical clearing component.

FIG. 2D is a circuit diagram of the circuit 250 illustrated in FIG. 2C in a configuration following the detection of a resistive short 208. An arrow 248 shows the flow of a current through the electrical clearing component (i.e., resistor 230 and transistor 234) of circuit 250. As a result of the detection of the event, control signals applied to gates 238 and 242 may be utilized to impede the flow of current through resistor 222 and to facilitate the flow of current through transistor 234. As described above, resistor 230 may have a relatively low resistance relative to resistor 222, and accordingly the current sourced by battery subdivision 214 may increase.

The relative resistances of resistor 222 and resistor 230 may be selected such that the current that would flow through resistor 222 is within the operating range of fuse 216, while the current that would flow through resistor 230 exceeds the operating range of fuse 216. Control signals applied to gates 238 and 242 may be configured to operate mutually exclusively, so that current is directed either through resistor 222 or through resistor 230, but not through both resistor 222 and resistor 230. According to some embodiments, appropriate control signals may also be applied to gates 240 and 244 following the detection of the event. In such embodiments, current may be permitted to flow through resistors 234, transistor 242, resistor 232, and transistor 236. Such embodiments may result in a further increase in current flow. The increase in current flow may exceed the operating range of fuses 216, 218, and 220, and accordingly, the increased current may cause fuses 216, 218, and 220 to interrupt the flow of additional current.

When a current exceeding a threshold flows through fuse 216 or 218, the flow of current through resistive short 208 may be interrupted. As a result of fuse 216 exceeding the threshold and interrupting the flow of current, voltage $V_2$ may fall to zero. According to some embodiments, circuit 250 may provide electrical power to a pack wiring harness, pack sense lead electronics, or other components. When fuse 216 is triggered (i.e., the fuses maximum current is exceeded), electrical components drawing power from battery subdivision 214 may be deenergized. For example, in some embodiments, resistor 230 may have in electrical resistance of 1Ω. Accordingly, if control signal 242 facilitates the flow of current through transistor 234, a current 3.7 amps may be induced. This current exceeds the threshold associated with fuse 216, and accordingly fuse 216 may open, thus interrupting the flow of additional current.

As described above, a circuit, such as circuit 250, that incorporates an electrical clearing component may realize certain improvements with respect to systems relying on passive fusing or manual cell discharge. For example, circuit 250 may mitigate against delayed thermal events in vehicle battery packs following an impact event, may eliminate or reduce the need for manual intervention on severely damaged vehicles in order to discharge certain electrical components, may provide immediate mitigation of resistive short failures, and accordingly, may be tied to other actions or events that exist external or internal to the vehicle.

Figure 3:
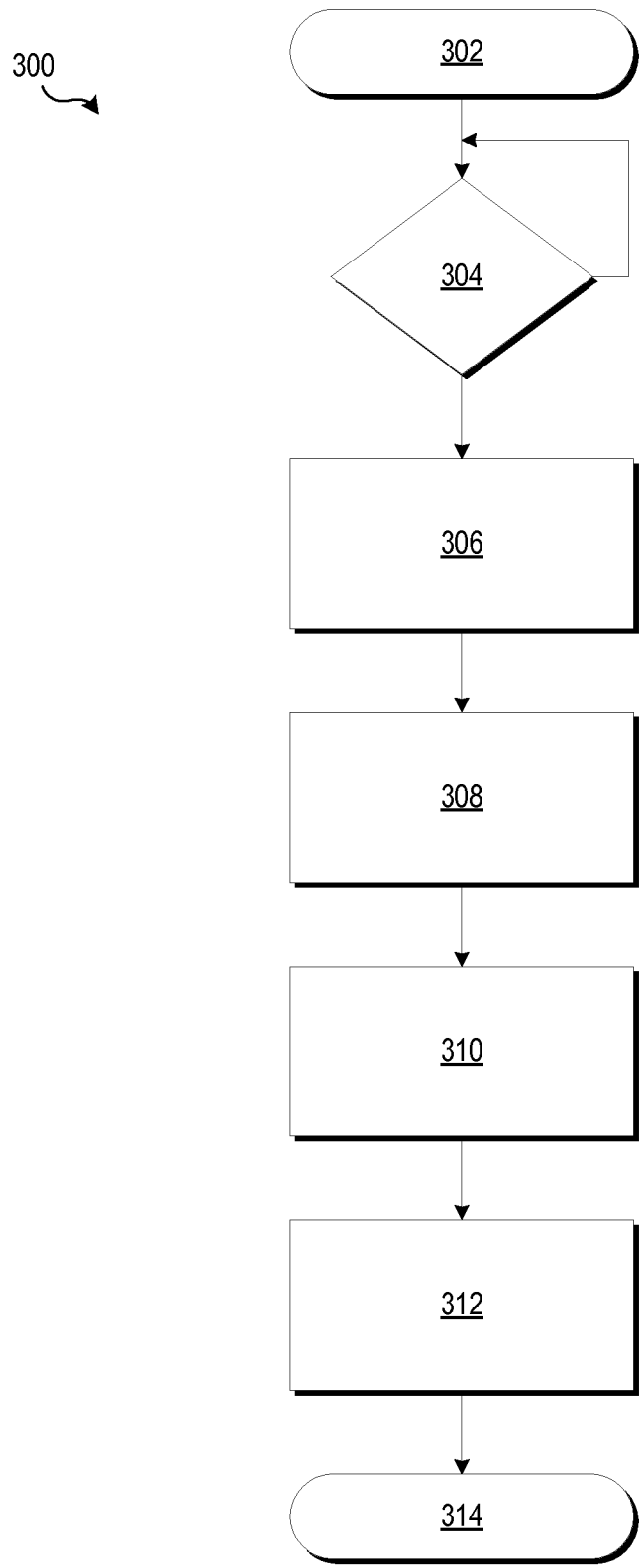
FIG. 3 is a flow chart of a method for actuating an electrical clearing component based upon detection of an event.

FIG. 3 illustrates a flow chart of a method 300 for actuating an electrical clearing component based upon detection of an event, according to certain embodiments. In certain embodiments, the method 300 may be performed, at least in part, utilizing any of the systems and/or circuits described above in reference to FIGS. 1-2D. At 302, method 300 may be initiated. At 304, it may be determined whether an event has been detected using a detection system. The detection system may comprise one or more sensors configured to detect one or more events of various types. For example, an event may include a resistive short circuit, a crash event, a coolant leak, or the like. Method 300 may remain at 304 until an event is detected.

When an event has been detected, at 306, the detection of the event may be communicated to a control system. The control system may be configured to monitor and control various aspects of a battery system, which according to some embodiments, may be incorporated into a vehicle. In response to the detection of the event, the control system may generate a control signal at 308. The control signal may initiate one or more actions in order to respond to the event. According to some embodiments, the control system may be at least partially implemented using machine executable instructions stored on a non-volatile machine-readable storage medium. According to such embodiments, the control system may comprise instructions for analyzing a variety of events and selectively taking action in order to take control action in order to mitigate consequences associated with the event.

According to the illustrated embodiment, at 310, an electrical clearing component may be actuated based on the control signal. An electrical clearing component may be disposed in parallel with a load. As disclosed above in connection with FIGS. 2A-2D, an electrical clearing component may comprise a resistor disposed in parallel with a switch component. In typical operation, the switch component may impede the flow of current through the resistor. Upon the detection of the event, the switch component may reconfigure the circuit by facilitating the flow of current through the resistor. The resistor may be sized in order to cause a relatively large current to flow in response to detection of the event.

Returning to a discussion of FIG. 3, at 312, the flow of current may be interrupted using a current interruption component. The current interruption component may be triggered based upon a condition resulting from actuation of the electrical clearing component. For example, the current interruption component may comprise a fuse or circuit breaker. The condition may comprise a flow of current in excess of a threshold. When the flow of current exceeds the threshold, the fuse or circuit breaker may open and interrupt the flow of current. According to some embodiments, the current interruption component may be configured to interrupt a circuit that provides electrical power to a battery pack wiring harness, battery pack sense leads, a battery pack sense lead electronics, or the like. Method 300 may terminate at 314.

Figure 4:
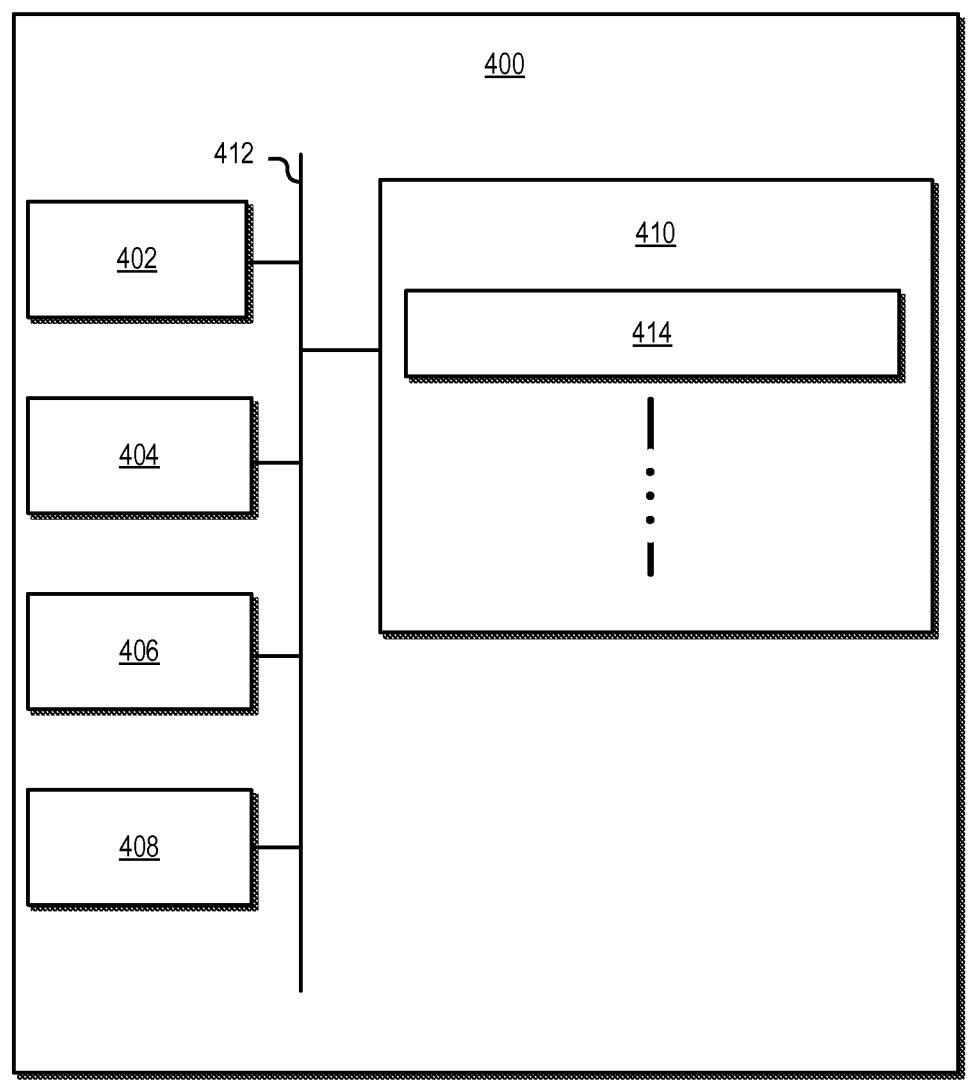
FIG. 4 illustrates a block diagram of a computer system for implementing certain embodiments of the present disclosure.

FIG. 4 illustrates a block diagram of a computer system 400 for implementing certain embodiments of the systems and methods disclosed herein. In certain embodiments, the computer system 400 may be a personal computer system, an on-board vehicle computer system, and/or any other type of system suitable for implementing the disclosed systems and methods. In further embodiments, the computer system 400 may be any portable electronic computer system or electronic device.

As illustrated, the computer system 400 may include, among other things, one or more processors 402, random access memories ("RAM") 404, communications interfaces 406, user interfaces 408, and/or non-transitory computer-readable storage mediums 410. The processor 402, RAM 404, communications interface 406, user interface 408, and computer-readable storage medium 410 may be communicatively coupled to each other via a common data bus 412. In some embodiments, the various components of the computer system 400 may be implemented using hardware, software, firmware, and/or any combination thereof.

The user interface 408 may include any number of devices allowing a user to interact with the computer system 400. User interface 408 may be used to display an interactive interface to a user. User interface 408 may be configured to provide information relating to actions undertaken by a control system in response to detection of an event. For example, the event may comprise a resistive electrical short associated with one or more battery subdivisions. The control system may provide an indication via the user interface 408 of the particular battery subdivision associated with the resistive electrical short.

The user interface 408 may be a separate interface system communicatively coupled with the computer system 400 or, alternatively, may be an integrated system such as a display interface for a laptop or other similar device. In certain embodiments, the user interface 408 may be produced on a touch screen display. The user interface 408 may also include any number of other input devices including, for example, keyboard, trackball, and/or pointer devices.

The communications interface 406 may be any interface capable of communicating with other computer systems and/or other equipment (e.g., sensors configured to detect an event) communicatively coupled to computer system 400. For example, the communications interface 406 may allow the computer system 400 to communicate with other computer systems (e.g., computer systems configured to perform diagnostic assessments associated of a battery system or a control system). The communications interface 406 may include, among other things, a modem, an Ethernet card, and/or any other suitable device that enables the computer system 400 to connect to databases and networks, such as LANs, MANs, WANs and the Internet.

The processor 402 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

The processor 402 may be configured to execute computer-readable instructions stored on the non-transitory computer-readable storage medium 410. Computer-readable storage medium 410 may store other data or information as desired. In some embodiments, the computer-readable instructions may include computer executable functional modules 414. For example, the computer-readable instructions may include one or more functional modules 414 configured to implement all or part of the functionality of the systems and methods described above. Specific functional models 414 may be included that correspond to at least a portion of a detection system, a control system, and the like.

The system and methods described herein may be implemented independent of the programming language used created the computer-readable instructions and/or any operating system operating on the computer system 400. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 400 may be in response to user commands, results of previous processing, or a request made by another processing machine. It will be appreciated that computer system 400 may utilize any suitable operating system including, for example, Unix, DOS, Android, Symbian, Windows, iOS, OSX, Linux, and/or the like.

Although the foregoing has been described in some detail for purposes of clarity, it will be apparent that certain changes and modifications may be made without departing from the principles thereof. Similarly, certain features of the embodiments disclosed herein may be configured and/or combined in any suitable configuration or combination. Additionally, certain systems and/or methods disclosed herein may be utilized in battery systems not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus.

Those having skill in the art will appreciate that many changes may be made to the details of the above-described embodiments without departing from the underlying principles of the invention. The scope of the present invention should, therefore, be determined only by the following claims.

The invention claimed is:

1. A system configured to actuate an electrical clearing component based upon detection of an event, the system comprising:
   a detection system configured to detect an event;
   a control system configured to receive information from the detection system and to generate a first control signal based upon detection of the event;
   a battery;
   a first electrical clearing component in electrical communication with the battery and configured to be selectively actuated based on the first control signal;
   a first current interruption component configured to selectively interrupt a flow of current upon an occurrence of a condition that results from actuation of the first electrical clearing component and to discharge a circuit in electrical communication with the first current interruption component; and
   contactors configured to enable discharge of the battery independent of the first current interruption component;

wherein upon detection of the event by the detection system, the control system is configured to generate the first control signal to actuate the first electrical clearing component, the actuation of the first electrical clearing component being configured to trigger the first current interruption system.

2. The system of claim 1, wherein the battery further comprising a lithium ion battery comprising a plurality of battery subdivisions;
wherein the first electrical clearing component and the first current interruption component are associated with one of the plurality of battery subdivisions.

3. The system of claim 1, further comprising:
a second electrical clearing component configured to be selectively actuated based on the second control signal; and
a second current interruption component configured to selectively interrupt a flow of current based on actuation of the second electrical clearing component;
wherein the second current interruption component interrupts an electrical circuit that provides electrical power to one of a pack wiring harness and pack sense lead electronics of the battery.

4. The system of claim 3, further comprising:
wherein the control system is configured to generate the second control signal to actuate the second electrical clearing component subsequent to generation of the first control signal.

5. The system of claim 1, wherein the condition comprises the flow of current exceeding a threshold.

6. The system of claim 1, wherein the first current interruption component is electrically coupled between a battery and the first electrical clearing component.

7. The system of claim 1, wherein the first electrical clearing component is disposed in parallel with a cell balancing resistor and a cell balancing switch.

8. The system of claim 1, wherein the event comprises one of detection of a resistive short, an impact event, and a coolant leak.

9. The system of claim 1, further comprising:
a processor; and
a non-volatile computer readable storage medium in communication with the processor and configured to store instructions executable on the processor;
wherein the control system comprises instructions executable on the processor and stored on the non-volatile computer readable storage medium to generate the first control signal based upon detection of the event.

10. A mitigation system in a vehicle, comprising:
a first battery component;
a second battery component;
a detection system configured to detect an event;
a control system configured to receive information from the detection system and to generate a first control signal based upon detection of the event;
a first electrical clearing component in electrical communication with the first battery component and configured to be selectively actuated based on the first control signal;
a second electrical clearing component in electrical communication with the second battery component, and second electrical clearing component operable independent of the first control signal;
a first current interruption component in electrical communication with the first battery component, the first current interruption component configured to selectively interrupt a flow of current based on the first control signal and to discharge a circuit in electrical communication with the first current interruption component; and
contactors configured to enable discharge of the first battery component;
independent of the first current interruption component;
wherein upon detection of the event by the event detection system, the control system generates the first control signal in order to actuate the first electrical clearing component, the actuation of the first electrical clearing component configured to trigger only the first current interruption system.

11. The system of claim 10, wherein the second current interruption system interrupts an electrical circuit that provides electrical power to one of a pack wiring harness and pack sense lead electronics.

12. The system of claim 11, wherein the control system is configured to generate a second control signal to actuate the second electrical clearing component subsequent to generation of the first control signal.

13. The system of claim 10, wherein the control system generates the first control signal independent of an occurrence of a pack level fault and independent of a state of charge of the battery.

14. The system of claim 10, further comprising:
a processor; and
a non-volatile computer readable storage medium in communication with the processor and configured to store instructions executable on the processor;
wherein the control system comprises instructions executable on the processor and stored on the non-volatile computer readable storage medium to generate the control signal based upon detection of the event.

* * * * *